United States Patent [19]

Miller

[11] Patent Number: 4,852,078
[45] Date of Patent: Jul. 25, 1989

[54] IMPACT-ABSORBING BUFFER ELEMENT FOR OPTICAL DISK CARRIER

[75] Inventor: Stephen H. Miller, Rochester, N.Y.

[73] Assignee: Eastman Kodak Company, Rochester, N.Y.

[21] Appl. No.: 208,338

[22] Filed: Jun. 16, 1988

[51] Int. Cl.⁴ .................. G11B 17/01; G11B 23/02; B65D 85/57

[52] U.S. Cl. .................. 369/291; 206/312; 206/444; 360/133; 369/77.2

[58] Field of Search .............. 369/77.2, 291, 292; 206/309, 312, 316, 444; 360/133

[56] References Cited

U.S. PATENT DOCUMENTS

| | | | |
|---|---|---|---|
| 4,433,410 | 2/1984 | Siryj et al. | 369/291 |
| 4,481,617 | 11/1984 | Mabry | 369/77.2 |
| 4,608,681 | 8/1986 | Shigsaki | 369/291 |
| 4,747,484 | 5/1988 | Ackeret | 206/309 |

FOREIGN PATENT DOCUMENTS

| | | | |
|---|---|---|---|
| 170957 | 2/1986 | European Pat. Off. | 369/291 |
| 2210818 | 9/1973 | Fed. Rep. of Germany | 369/194 |
| 1540593 | 2/1979 | United Kingdom | 369/77.2 |

*Primary Examiner*—Steven L. Stephan
*Attorney, Agent, or Firm*—Warren W. Kurz

[57] ABSTRACT

A carrier for an optical disk or the like is provided with a pair of resilient buffer elements to isolate the relatively delicate disk assembly from impulse spikes to which the carrier may be subjected. The disk carrier comprises a pair of frame members having respective arcuate surfaces which cooperate to define a generally circular aperture for receiving a data storage disk. The resilient buffer elements are arranged along such arcuate surfaces, each element having a groove-defining surface which is adapted to support the periphery of an optical disk. The carrier frame members are slidably coupled so as to vary the size of the circular aperture defined by their respective arcuate surfaces, and means are providing for urging the carrier frame members together so that a disk positioned in the carrier's aperture is engaged and supported by the grooves formed in the buffer elements.

7 Claims, 5 Drawing Sheets

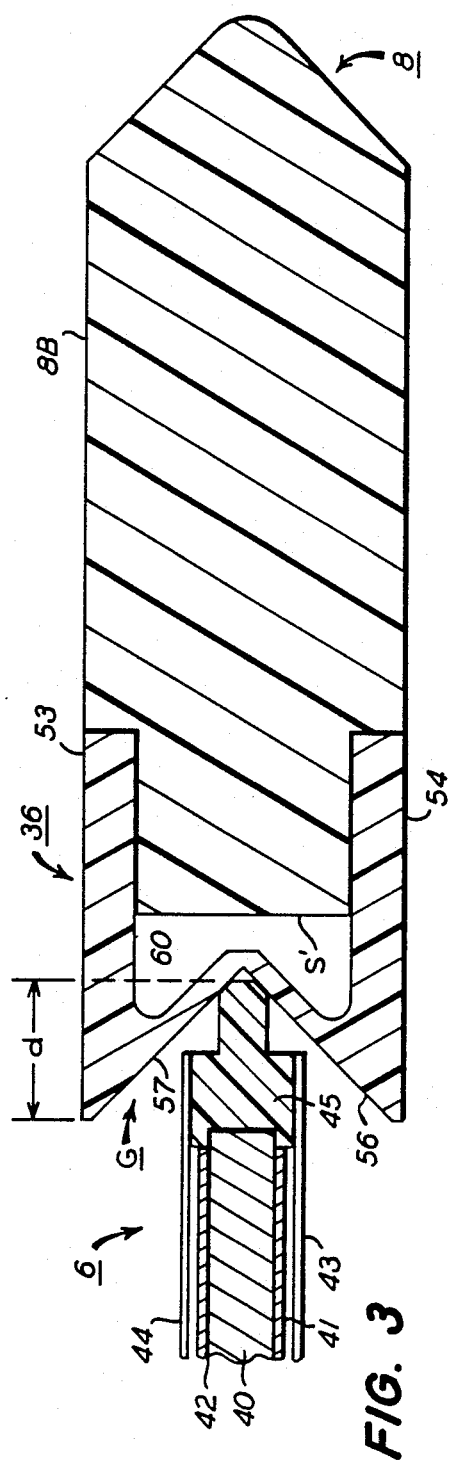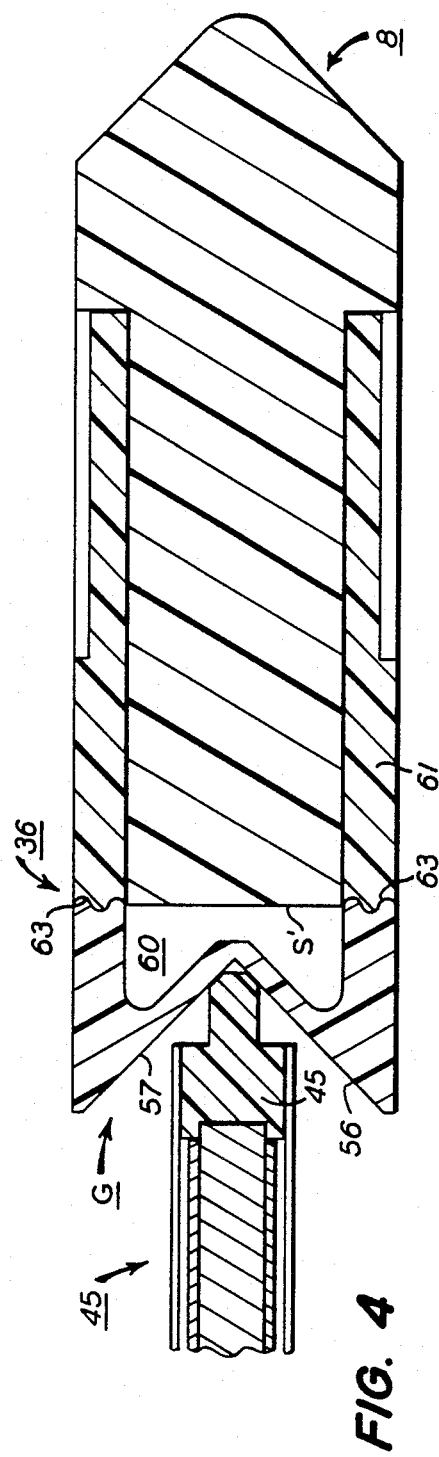

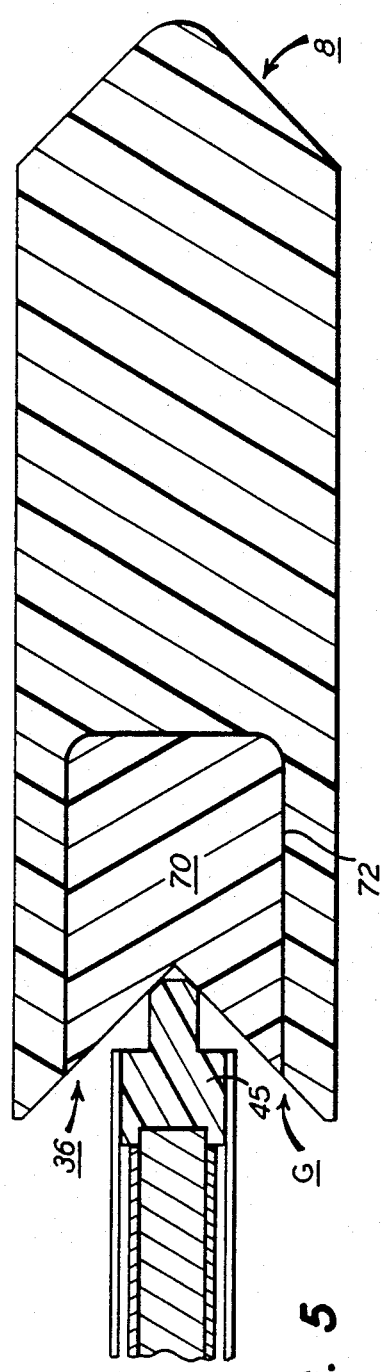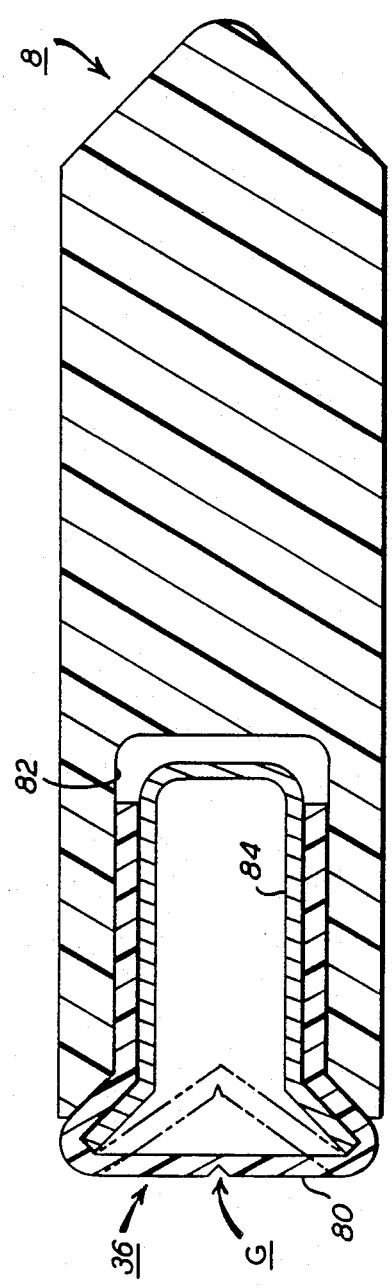

IMPACT-ABSORBING BUFFER ELEMENT FOR OPTICAL DISK CARRIER

BACKGROUND OF THE INVENTION

The present invention relates to the field of data storage and retrieval. More particularly, it relates to improvements in apparatus for facilitating the handling and transport of relatively delicate data storage disks, in particular optical disks.

Owing to their intrinsic nature, it is at least highly desirable that the recording surfaces of an optical disk be protected from physical contact during handling, transport and use. Because of the immense data packing density, even a tiny scratch or mark on the disk can mean the loss of kilobytes of information. Accordingly, it is common practice to dispose an optical disk in a so-called disk "carrier" which functions to support a disk only at its periphery and provide a means for handling the disk without touching its recording surfaces. Such carriers typically comprise a generally rectangular frame having a circular aperture for receiving a disk, and means spaced about such aperture for supporting a received disk at its periphery. Optical disk carriers of this type are disclosed, for example, in U.S. Pat. No. 4,481,617, and in the commonly assigned U.S. application Ser. No. 923,509, entitled "Carrier for Data Storage Disk", filed on Oct. 27, 1986 in the names of D. J. Stark et al.

In the optical disk-carriers of the prior art, the disk is supported by a plurality of rigid tabs and/or latches spaced about the carrier aperture. These tabs and latches contacts the disk periphery only over a relatively short arc length (e.g. a few degrees) and are selectively movable toward and away from the disk periphery to capture and release a disk, respectively. Because of the relatively short arc length over which each of these tabs and latches engages the disk periphery, the carrier/disk assembly tends to be somewhat flexible and, under certain circumstances, this flexibility can lead to transport problems, for example, in automated disk-handling equipment. Moreover, for the same reason, the disk can, under certain circumstances, become separated from the carrier.

In the commonly assigned U.S. application Ser. No. 208,190 entitled "Split Carrier for Data Storage Disks" filed concurrently herewith in the names of Roger Covington et al, there is disclosed a disk-carrier which alleviates the above-noted disadvantages of the prior art carriers. Such a disk carrier comprises a pair of identical crescent-shaped frame members which are slidably coupled to define a generally circular aperture for receiving an optical disk or the like. The aperture-defining arcuate surfaces of the frame members are provided with a continuous groove which serves to engage a disk perimeter over a major arc length (e.g. more than 200 degrees). By this arrangement, the disk/carrier assembly is substantially less susceptible to premature release of the disk. This carrier has been referred to as a "split" carrier in that it is composed of two frame members which split apart to receive and release a disk.

In the split carrier referred to above, a pair of springs urge the frame members together and, of course, towards engagement with the disk perimeter. The frame members are made of a hard plastic or the like which is highly transmissive of shock waves. Thus, in the event the carrier frame is subjected to an impulse spike, as may be the case should the carrier/disk assembly fall onto the floor from a table top, such impulse will be transmitted, substantially unattended, to the retained disk. If large enough, impulses of this type can produce performance degradation in certain types of optical disk structures, particularly those in which the optical disk's recording layers are protected by closely spaced, transparent cover sheets.

SUMMARY OF THE INVENTION

In view of the foregoing discussion, an object of this invention is to provide a disk carrier which is less susceptible to transmitting shock waves which the carrier may experience to a retained disk.

The disk carrier apparatus of the invention basically comprises a pair of frame members having respective arcuate surfaces which cooperate to define a major portion of a generally circular aperture for receiving a data storage disk, and means for slidably coupling such frame members to vary the size of the aperture. Each of the arcuate surfaces of the frame members is provided with a resilient buffer element having a groove therein for supporting the peripheral portion of a disk located within the carrier aperture. Spring means are provided for urging the frame members together so that a disk located within the aperture is supported by the grooves in the buffer elements. The buffer elements function to substantially isolate the disk from any shock waves being transmitted by the carrier frame members. Further, the buffer elements serve to absorb dimensional variations in the disk, and to simplify the carrier mold used for producing the frame members.

The invention and its advantages will become more apparent to those skilled in the art from the ensuing detailed description of the preferred embodiments, reference being made to the accompanying drawings.

BRIEF DESCRIPTION OF THE DRAWINGS

FIG. 3 is a cross-sectional view of a portion of the disk carrier shown in FIG. 2A, showing the cross-section of a preferred buffer element; and FIGS. 4-6 are cross-sectional illustrations of alternative buffer elements.

DETAILED DESCRIPTION OF THE PREFERRED EMBODIMENTS

Figure 1:
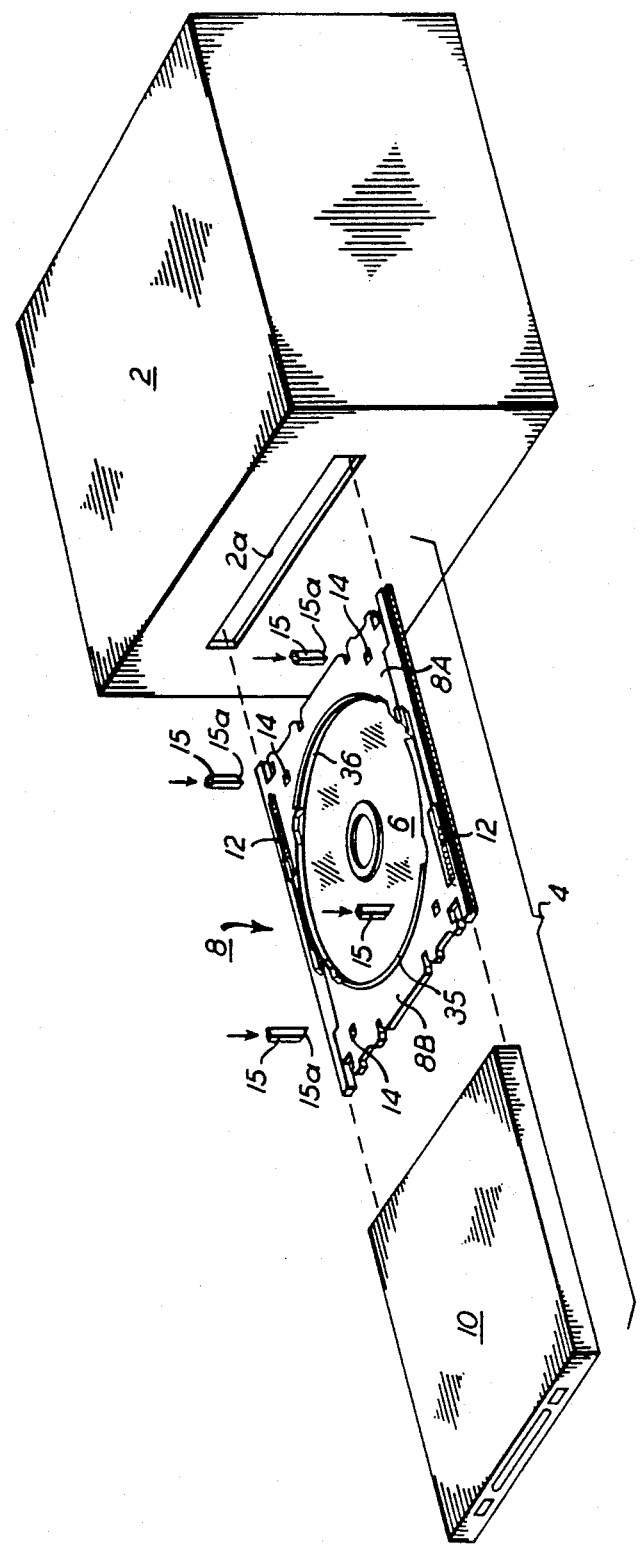
FIG. 1 is a perspective schematic of an optical disk recording system embodying the invention.

Referring now to the drawings, FIG. 1 illustrates an optical recording system comprising a disk drive unit 2 and a disk/carrier cartridge assembly 4. The latter basically comprises a rigid optical disk 6, a disk carrier 8 for facilitating the handling of disk 6, and a protective cartridge 10. Disk carrier 8 serves to releasably capture disk 6 so that the disk is accurately and securely registered within the carrier structure, yet is capable of being readily removed from the carrier for rotation in a plane spaced from the carrier. When not in use, the carrier and its captured disk are positioned within the protective cartridge, the latter being sufficiently rigid to guard against contact with the disk's recording surfaces. In use, the carrier-loaded cartridge is inserted into the disk drive unit through a slot 2a. Upon entering the disk drive unit, a mechanism within serves to extract the disk carrier from the cartridge and to return the cartridge to the user. The disk drive unit also includes apparatus for releasing the disk from its carrier and for loading the disk onto a drive spindle assembly for rotation. Such an apparatus is disclosed, for example, in the commonly assigned U.S. application Ser. No. 923,508, filed on Oct. 27, 1986 in the name of Dwight Petruchik, et al.

Figure 2A:
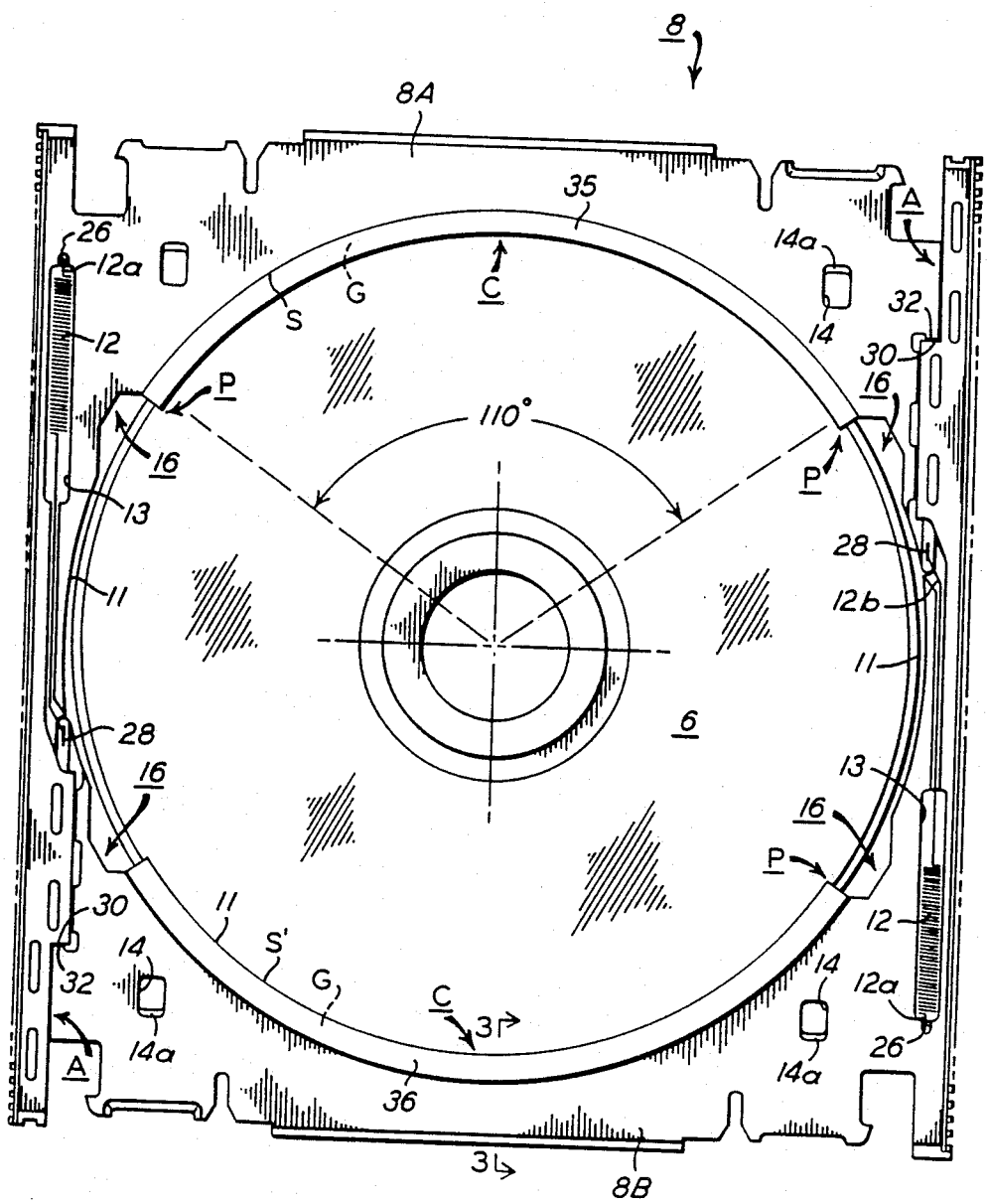
FIGS. 2A and 2B are plan views of a disk carrier embodying the invention, such views showing the components of the carrier in disk-retaining and disk-releasing positions, respectively.
Figure 2B:
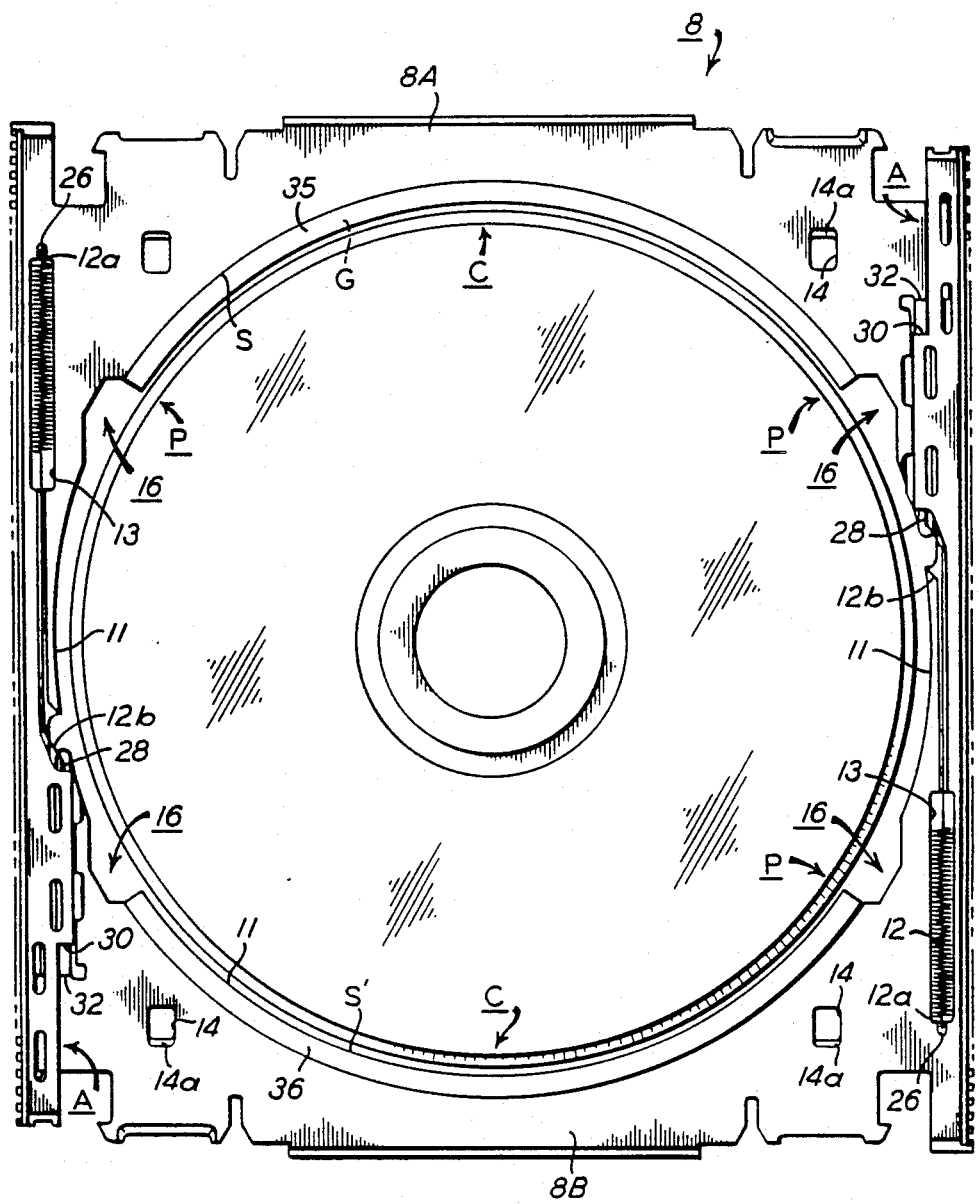

Referring additionally to FIGS. 2A and 2B, disk carrier 8 basically comprises a pair of crescent-shaped frame members 8A, 8B having arcuate surfaces S, S', respectively, which cooperate to define a generally circular aperture 11 for receiving data storage disk 6. As explained in the aforementioned U.S. application Ser. No. 208,910, filed concurrently herewith, the crescent-shaped frame members are slidably connected by a tongue groove arrangement A so that the size of the circular aperture can be varied, whereby a data storage disk can be captured within the aperture when the frame members are relatively close together, as shown in FIG. 2A, and released from the aperture when the frame members are relatively far apart, as shown in FIG. 2B. Spring means, preferably in the form of a pair of coil springs 12, serve to resiliently urge the frame members toward each other, i.e., toward disk-capturing positions. Springs 12 are arranged in recesses 13 formed in frame members 8A and 8B. Spring ends 12a and 12b are connected to small apertures 26 and 28, respectively, formed in frame members 8A and 8B. The carrier frame members are provided with reference surfaces 30, 32 which abut when the carrier is empty, i.e., no disk is present. When a disk is present these reference surfaces are spaced slightly apart owing to the fact that the disk/carrier engagement prevents these surfaces from meeting.

Preferably, each frame member is provided with structure which facilitates movement of the frame members apart to enable release of the disk for use. Such structure may comprise, for example, a plurality of rectangular apertures 14, each having a bevelled edge 14a which is adapted to be engaged by a like plurality of release pins 15, shown in FIG. 1. The interaction of such release pins and apertures to effect disk release is fully described in the aforementioned Petruchik et al application. Briefly, however, downward movement of the release pins into apertures 14 causes cam surfaces 15a to engage the bevelled edges 14a of apertures 14. As the release pins move through these apertures, cam surfaces 15a exert lateral forces on the frame members, thereby moving such members apart against the biasing forces provided by springs 12.

Capture of a disk within aperture 11 is effected by a pair of resilient buffer elements 35, 36 arranged along surfaces S, S' of frame members 8A, 8B. As explained below the buffer elements are resilient in nature and function, inter alia, to isolate the optical disk from any shock waves propagating in the carrier frame members. Each of the buffer elements is shaped and dimensioned to support a disk at its periphery over an arc length of at least 50°, and preferably over an arc length of about 110°, as shown. Support for the disk is provided by a groove G formed in the buffer elements To reduce the amount by which the frame members must be separated in order to release a disk from the groove, it is preferred that the groove depth d (shown in FIG. 3) be reduced from a maximum depth of about 4 millimeters at center C of the buffer element, to a minimum depth of about 2 millimeters at the points P located at the end of the buffer elements. In the carrier shown in FIG. 2A, the length of the disk-supporting groove is determined by the position of cutouts 16 in the carrier aperture. These cutouts provide clearance for a disk-supporting mechanism associated with the disk drive which serves to support a disk at the time of its release from the carrier. By supporting the disk over a total arc length of at least 100°, premature disk release is minimized, and the carrier/disk assembly is relatively rigid and thereby easy to handle.

Referring now to FIG. 3, a preferred buffer element construction is shown in cross-section. Before describing element 35, however, a few words about disk 6 are appropriate since the desirability of using these buffer elements has arisen from a particular disk structure. As shown, optical disk 6 may comprise a rigid substrate 40 (e.g. aluminum) having optical recording layers 41, 42 on both of its opposing planar surfaces. The recording layers are protected by transparent cover sheets 43, 44 (e.g. thin sheets of transparent polycarbonate) which are closely spaced (e.g. less than a millimeter) from the recording layers by concentric spacer rings. The latter include a perimeter spacer ring 45 which is friction fitted to the perimeter 6A of the disk substrate. In addition to preventing dust and other contaminates from physically contacting the recording layers, the spaced cover sheets also serve to displace such contaminates from the depth of field of of the write/read laser beam and thereby render such contaminates non-detectable. The friction fit between substrate and perimeter ring is advantageous from the standpoint that it enables a more uniform tensioning of the cover sheets. As may be appreciated, even a slight displacement or skew of the perimeter ring can cause the cover sheet to touch down on the recording layer. Such displacement of the cover sheet can degrade the performance characteristics of the disk. Since the disk carrier, during handling, can be subjected to impulses which, if transmitted to the disk, could upset the relative positions of the disk components, it is desirable to isolate the disk perimeter from such impulses.

Still referring to FIG. 3, buffer element 36 is shown to comprise a unitary structure having a pair of spaced parallel flanges 53, 54 which are adapted to be bonded to recesses formed in the top and bottom surfaces of the frame member 8B, and a pair of converging members 56, 57, which cooperate to define the V-shaped groove G for receiving the periphery of the data storage disk. In this embodiment, the buffer elements are made of plastic, such as polyurethane, having a wall thickness of about 1 mm. Preferably, the durometer of the plastic structures is less than 50 Å, whereby members 56, 57 yield (i.e. change shape) under the force exerted on the disk by carrier springs 12 to accommodate the disk periphery. In this embodiment, an air space 60 is provided between the buffer elements and the arcuate carrier frame surfaces S, S' to accommodate movement of the converging members as they change shape to capture a disk. This air space, together with the "softness" of members 56, 57 acts to physically buffer the disk from the carrier, thereby allowing the carrier to undergo forces which might otherwise adversely affect the disk integrity and performance.

Alternative constructions for buffer elements 35, 36 are shown in the cross-sectional illustrations of FIGS. 4–6. The buffer element shown in FIG. 4 is a two-piece plastic structure having substantially the same overall shape as the buffer element shown in FIG. 3. Here, however, plastics of different hardness are used. The disk-supporting portions 60 of the buffer element is substantially more flexible than that portion 61 which is bonded to the carrier frame. Portions 60 and 62 are adhesively bonded along joints 63. Note, while the construction can be achieved by assembling individual plastic components, a one-piece, dual-durometer can be achieved by conventional extrusion process. If the buffer element is formed by extrusion, the depth of the groove G will be constant, rather than variable, as may be achieved by a casting process.

In FIG. 5, buffer element 36 takes the form of a solid member 70 which is bonded in a U-shaped groove 72 formed in the carrier frame. Member 70 is made of a soft elastomer (e.g. having a durometer of 30 Å or less). Here, again, a V-shaped groove G is provided in member 70 to assure that the disk periphery seats itself in the center of the buffer element. Owing to the compliant nature of member 70, the disk is isolated from shock waves in the carrier frame.

In FIG. 6, buffer element 36 is shown to comprise a flexible (e.g. rubber) membrane 80 which is stretched across a U-shaped groove 82 formed in the carrier frame by a metal spring clip 84. Preferably, a small groove G is formed in the member to facilitate centering of the disk periphery in the membrane. When a disk is received and supported by the carrier, the buffer element flexes to the position shown in phantom lines.

The invention has been described in detail with particular reference to certain preferred embodiments thereof, but it will be understood that variations and modifications can be effected within the spirit and scope of the invention.

What is claimed is:

1. Disk-carrier apparatus for facilitating the handling of data storage disk, said apparatus comprising:
   (a) a pair of frame members having respective arcuate surfaces which cooperate to define a major portion of a generally circular aperture for receiving a data storage disk;
   (b) means for slidably coupling said frame members to vary the size of said aperture;
   (c) a pair of resilient buffer elements one of said buffer elements being arranged along substantially the entire length of each of said arcuate surfaces, each of said buffer members defining a groove for supporting a peripheral portion of a disk located within said aperture; and
   (d) means for urging said frame members together so that a disk located within said aperture is supported by the grooves in said buffer elements.

2. The apparatus as defined by claim 1 wherein each of said buffer members comprises an arcuate, resilient member having (a) a pair of spaced, parallel flanges adapted to be supported by one of said frame members in the vicinity of the arcuate surface thereof, and (b) a pair of converging members extending from said parallel flanges, said converging members defining said groove.

3. The apparatus as defined by claim 2 wherein said flanges and converging members define an air space between said groove-defining converging members and the arcuate surface of said frame member.

4. The apparatus as defined by claim 2 wherein said flanges and converging members are of different hardness.

5. The apparatus as defined by claim 1 wherein each of said buffer elements comprises a deformable member disposed in a groove defined by one of said arcuate surfaces.

6. The apparatus as defined by claim 5 wherein said deformable member comprises an elastomer.

7. The apparatus as defined by claim 1 wherein each of said buffer elements comprises an elastic membrane stretched across a groove defined in one of said arcuate surfaces.

* * * * *